(12) United States Patent
Schelfaut et al.

(10) Patent No.: US 11,077,954 B2
(45) Date of Patent: Aug. 3, 2021

(54) CONNECTION ASSEMBLY FOR MOUNTING ENGINE AND ENGINE MOUNTING SYSTEM COMPRISING THE SAME

(71) Applicant: General Electric Company, Schenectady, NY (US)

(72) Inventors: Timothy Leo Schelfaut, Lebanon, OH (US); Lawrence Jerome Meyer, Deerfield Township, OH (US); Anthony Michael Metz, Harrison, OH (US); Jonathan Edward Coleman, Mason, OH (US); Thomas Peter Joseph, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/847,968

(22) Filed: Dec. 20, 2017

(65) Prior Publication Data

US 2019/0185170 A1      Jun. 20, 2019

(51) Int. Cl.
*B64D 27/26* (2006.01)
*B64D 27/14* (2006.01)

(52) U.S. Cl.
CPC ............. *B64D 27/26* (2013.01); *B64D 27/14* (2013.01); *B64D 2027/268* (2013.01)

(58) Field of Classification Search
CPC ... B64D 27/26; B64D 27/14; B64D 2027/268
USPC .................... 248/554, 555, 556, 557; 244/54
See application file for complete search history.

(56) References Cited

U.S. PATENT DOCUMENTS

| | | | |
|---|---|---|---|
| 2,792,784 A | 5/1957 | Corrick et al. | |
| 4,717,094 A | 1/1988 | Chee | |
| 4,943,013 A | 7/1990 | Kapala et al. | |
| 5,452,575 A * | 9/1995 | Freid | F02C 7/20 60/797 |
| 5,746,391 A * | 5/1998 | Rodgers | B64D 27/18 244/54 |
| 5,927,644 A | 7/1999 | Ellis et al. | |
| 6,347,765 B1 * | 2/2002 | Jule | B64D 27/26 244/54 |
| 8,104,708 B2 * | 1/2012 | Chouard | B64D 27/26 244/54 |
| 8,561,941 B2 | 10/2013 | Combes et al. | |
| 8,770,513 B2 | 7/2014 | Barber et al. | |
| 9,010,681 B2 | 4/2015 | Bellanger et al. | |
| 9,114,882 B2 | 8/2015 | Robertson, Jr. et al. | |
| 9,919,804 B2 * | 3/2018 | Pautis | B64D 27/18 |
| 2004/0251380 A1 * | 12/2004 | Pasquer | B64D 27/26 244/54 |
| 2014/0369810 A1 * | 12/2014 | Binks | B64D 27/26 415/108 |

(Continued)

*Primary Examiner* — Muhammad Ijaz
(74) *Attorney, Agent, or Firm* — Hanley, Flight & Zimmerman, LLC (57) ABSTRACT

A connection assembly for mounting an engine to a mounting structure. The engine is rotatable about an axis of rotation and defines an axial direction extending along the axis of rotation from a forward end to an aft end. The engine has a center of gravity. The connection assembly includes: an engine coupling piece coupled to the engine; and a connection piece connecting the engine coupling piece and the mounting structure, the connection piece being inclined toward the axial direction. A mounting system including the connection assembly is also described.

10 Claims, 7 Drawing Sheets

(56) References Cited

U.S. PATENT DOCUMENTS

| | | | |
|---|---|---|---|
| 2015/0175268 A1* | 6/2015 | Guillou | B64D 27/26 |
| | | | 244/54 |
| 2016/0215654 A1* | 7/2016 | Ancuta | F01D 25/04 |
| 2016/0221682 A1* | 8/2016 | Pautis | B64D 27/18 |
| 2017/0197723 A1* | 7/2017 | Nakhjavani | B64D 27/26 |
| 2018/0009543 A1* | 1/2018 | Journade | F16B 37/047 |
| 2018/0186462 A1* | 7/2018 | Brochard | B64D 27/26 |
| 2019/0100324 A1* | 4/2019 | Journade | B64D 27/18 |
| 2019/0168861 A1* | 6/2019 | Fotouhie | B64C 15/12 |
| 2019/0185170 A1* | 6/2019 | Schelfaut | B64D 27/14 |
| 2020/0189759 A1* | 6/2020 | Auge | B64D 27/18 |

* cited by examiner

CONNECTION ASSEMBLY FOR MOUNTING ENGINE AND ENGINE MOUNTING SYSTEM COMPRISING THE SAME

BACKGROUND

The present disclosure generally relates to a connection assembly for mounting an engine and an engine mounting system comprising the connection assembly. More particularly, this disclosure relates to a connection assembly for mounting an aircraft engine and an aircraft engine mounting system comprising the connection assembly.

Some known gas turbine engines, such as turbofans, are desired to be mounted in an inclined way to minimize the bending moments that results as the gas turbine engine responds to loads thereon. The inclination leads to less backbone bending and less clearance distortion in the core of the gas turbine engine. There is a preferred value range for an aft inclination angle from a clearance perspective. However, there is a physical limitation of the aft inclination angle for currently available connection assemblies for mounting engines and engine mounting systems comprising the connection assemblies because of access issues. A mechanic cannot get a tool in the aft-side to operate if the aft inclination angle is greater than a certain degree, which is below the preferred range.

Therefore, there is a need to develop a new connection assembly for mounting an engine and an engine mounting system comprising the connection assembly.

BRIEF DESCRIPTION

In one aspect, embodiments of the present disclosure relate to a connection assembly for mounting an engine to a mounting structure. The engine is rotatable about an axis of rotation and defines an axial direction extending along the axis of rotation from a forward end to an aft end. The engine comprises a center of gravity. The connection assembly comprises: an engine coupling piece coupled to the engine; and a connection piece connecting the engine coupling piece and the mounting structure. The connection piece is inclined toward the axial direction.

In another aspect, embodiments of the present disclosure relate to an engine mounting system for mounting an engine to a mounting structure. The engine is rotatable about an axis of rotation and defines an axial direction extending along the axis of rotation from a forward end to an aft end. The engine comprises a center of gravity. The engine mounting system comprises: a connection assembly, comprising: an engine coupling piece coupled to the engine; and a connection piece connecting the engine coupling piece and the mounting structure, the connection piece being inclined toward the axial direction; an engine aft mount located aftward the connection assembly and coupling the engine and the mounting structure; and a thrust link located between the connection assembly and the engine aft mount and coupling the engine and the mounting structure.

Optionally, the connection assembly is forward of the center of gravity of the engine. Optionally, an inclination direction of the connection piece defines an acute angle with the axial direction. Optionally, the engine coupling piece is coupled to a fan case of the engine. Optionally, the connection piece is connected with an aircraft. Optionally, the connection piece comprises a link having a first end connected with the engine coupling piece, a second end opposite to the first end and connected with the mounting structure, and a beam between the first end and the second end and curved toward the axial direction. Optionally, the engine coupling piece comprises a yoke and a pair of lugs extending upwardly from the yoke and inclinedly toward the axial direction. Optionally, the second end of the connection piece is perpendicular to a direction extending out of a plane P defined by the axial direction and an inclination direction of the connection piece. Optionally, the engine coupling piece comprises a pair of lugs defining a cavity therebetween opening in the axial direction. Optionally, the engine coupling piece comprises a lug and the connection piece comprises a pair of links coupled with the lug.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to an axis of rotation or centerline of an engine. Moreover, the terms "radial" and "radially" refer to directions and orientations that extend substantially perpendicular to the centerline of the engine. In addition, as used herein, the terms "circumferential" and "circumferentially" refer to directions and orientations that extend arcuately about the centerline of the engine.

The term "coupled", "coupling", "connecting", or "connected", as used herein, is defined as coupled, coupling, connecting, or connected, directly or indirectly.

Embodiments of the present disclosure relate to connection assemblies and mounting systems for mounting gas turbine engines to an exterior of an aircraft, for example, on a wing or fuselage of the aircraft. More specifically, the connection assemblies and mounting systems described herein are designed to reduce or eliminate backbone bending of the gas turbine engine during certain engine operating conditions. In one embodiment, the connection assembly and the mounting system are coupled to a mounting structure, such as a pylon, of the aircraft wing. The configuration of the connection assembly and the mounting system facilitates reducing or eliminating backbone bending of the gas turbine engine during various engine operational modes/maneuver loads. Additionally, the connection assembly and the mounting system are capable of achieving this benefit while avoiding a substantial penalty in cost or weight typically associated with prior efforts to reduce backbone bending.

As used herein, the terms "vertical," "horizontal," "lateral," "forward," "aft," "upper," "lower," "above," "below," etc., may be used in reference to the perspective of the installation and orientation of the gas turbine engine on the aircraft, and therefore are relative terms that indicate the construction, installation and use of the gas turbine engine. However, it is within the scope of the disclosure that the aircraft engine mounting system could be installed on an engine that markedly differs from the gas turbine engine shown in the drawings, or installed at other points of the aircraft, for example, the fuselage. Finally, it is foreseeable that the connection assembly and the engine mounting system could find uses in applications other than aircraft engines.

Figure 1:
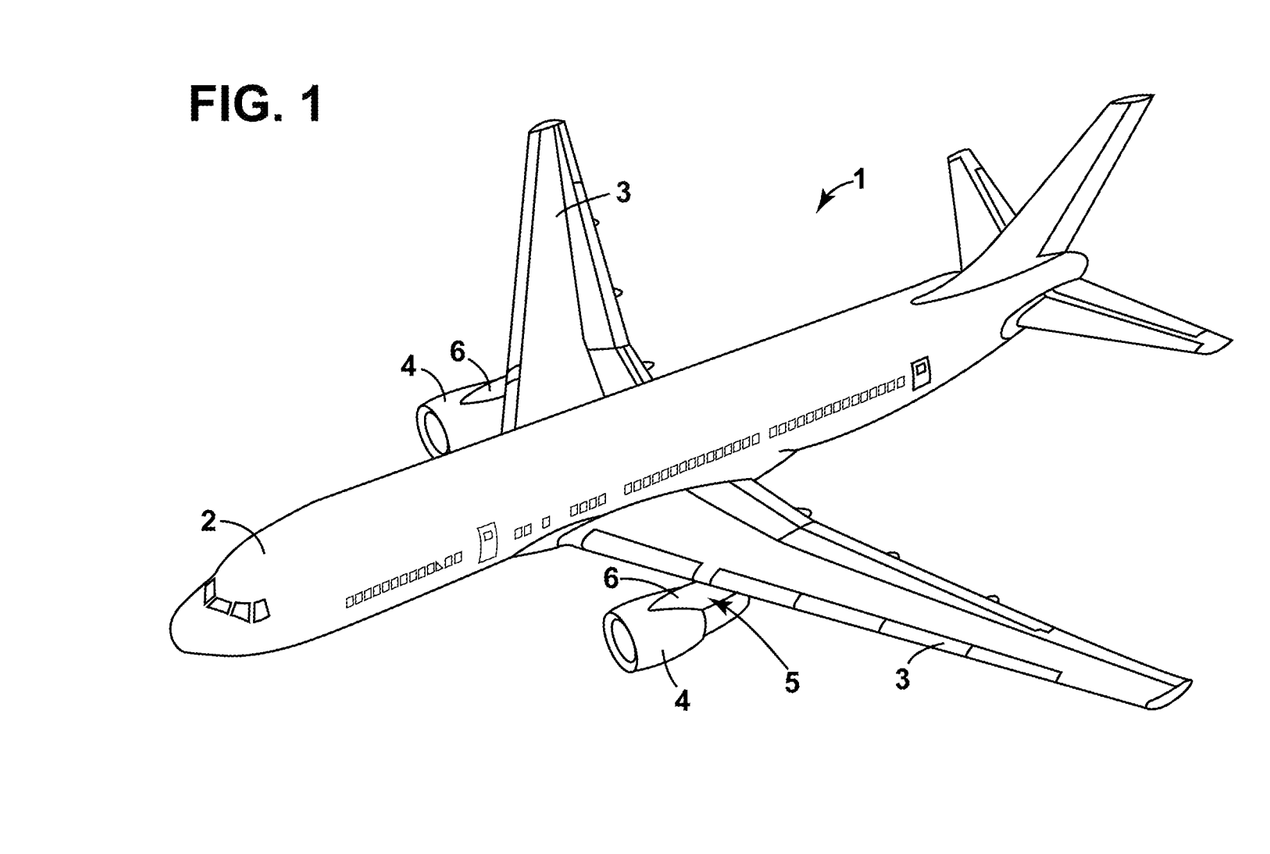
FIG. 1 is a perspective view of an aircraft in accordance with an example embodiment of the present disclosure.

Referring now to the drawings, in which like numerals refer to the same elements throughout the several views, FIG. 1 is a perspective view of an aircraft 1 in accordance with an example embodiment of the present disclosure. In the example embodiment, the aircraft 1 includes a fuselage 2 and a pair of laterally extending wings 3. Each wing 3 includes a gas turbine engine 4, which may be embodied in a high-bypass turbofan gas turbine engine, fixedly coupled to the wing 3 through a connection of an engine mounting system 5 and a mounting structure 6, such as a pylon of the aircraft 1. In some embodiments, the mounting structure 6 extends downwardly beneath the wing 3.

Figure 2:
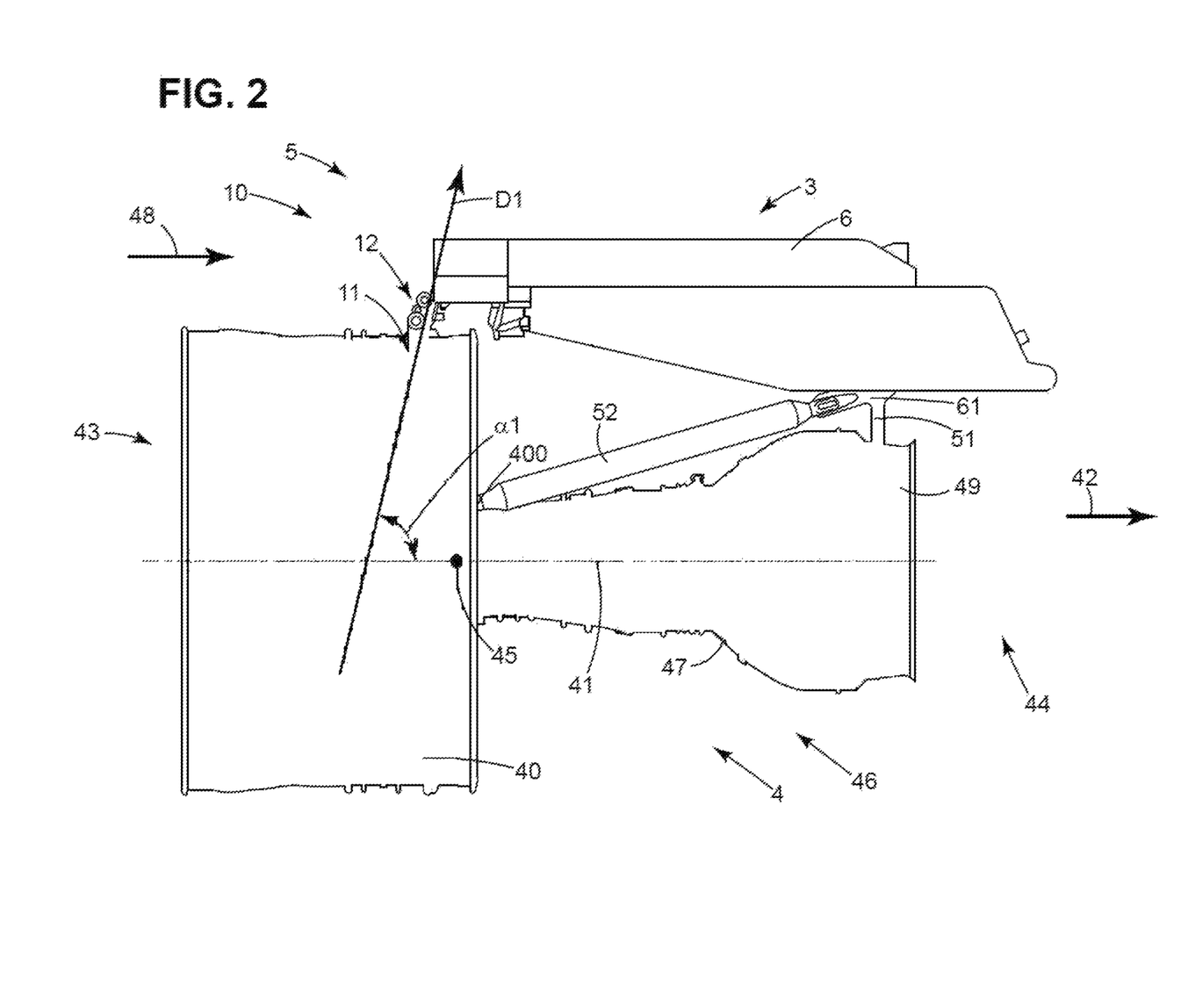
FIG. 2 shows a schematic side elevation view of part of an engine and an engine mounting system that may be used with the aircraft shown in FIG. 1.

FIG. 2 shows a schematic side elevation view of part of a gas turbine engine 4 and an engine mounting system 5 that may be used with the aircraft 1 shown in FIG. 1. In the example embodiment, the gas turbine engine 4 is rotatable about an axis of rotation 41 and defines an axial direction 42 extending along the axis of rotation 41 from a forward end 43 to an aft end 44. The gas turbine engine 4 comprises a center of gravity 45. The gas turbine engine 4 is schematically represented as including a fan case 40 and a core engine 46. The core engine 46 has an inner engine case 47. The inner engine case 47 is often referred to as the backbone of the gas turbine engine 4.

During climb and certain other aircraft operating modes, the axis of rotation 41 is pitched relative to a direction 48 of an approaching airflow. This aerodynamically-induced load, often referred to as the inlet load is in addition to the thrust load and can induce bending moments in the inner engine case 47 (backbone) causing the inner engine case 47 to deflect (bend) from its concentric position about the axis of rotation 41. Maintaining the concentricity of the inner engine case 47 about the axis of rotation 41 is important from the standpoint of minimizing blade tip clearances within the gas turbine engine 4, which has the beneficial effect of improving engine specific fuel consumption (SFC) and fuel burn. In addition, reduced backbone bending reduces the incidence of blade tip rub encounters with the surrounding engine structures (including the fan case 40), which promotes in-service performance retention. Engines 4 with a longer interval for time on-wing to removal for service provide reduced service contract costs to their operators. The inclined mounting of the engine 4 with respect to the aircraft 1 helps to reduce the bending/deflection of the inner engine case 47.

The engine mounting system 5 may be installed in a gas turbine engine of the aircraft 1 of the type represented in FIGS. 1 and 2 and therefore, as a matter of convenience, the same numbers used in FIGS. 1 and 2 will be used in FIGS. 3 through 7 to identify the same or functionally equivalent components.

Referring to FIG. 2, in some embodiments, the engine mounting system 5 comprises: a connection assembly 10, an engine aft mount 51 located aftward the connection assembly 10 and coupling the engine 4 and the mounting structure 6, and a thrust link 52 located between the connection assembly 10 and the engine aft mount 51 and coupling the engine 4 and the mounting structure 6.

In some embodiments, the engine aft mount 51 is pivotably coupled at one end to the mounting structure 6 and is also pivotably coupled at the opposite end thereof to a turbine frame 49 of the engine 4.

In some embodiments, the thrust link 52 extends between a link mount interface 61 on the mounting structure 6 and a link support connection 400 on the engine 4. More specifically, the thrust link 52 is pivotably coupled at one end to the link mount interface 61 and also pivotably coupled at the opposite end thereof to the link support connection 400.

In some embodiments, the connection assembly 10 is forward of the center of gravity 45 of the engine 4.

In some embodiments, the connection assembly 10 comprises: an engine coupling piece 11 coupled to the engine 4; and a connection piece 12 connecting the engine coupling piece 11 and the mounting structure 6. In some embodiments, the connection piece 12 is inclined toward the axial direction 42. In some embodiments, at least part of the connection piece 12 extends neither parallel to nor perpendicular with the axial direction 42.

In some embodiments, the engine coupling piece 11 is coupled to the fan case 40 of the aircraft engine 4 by way of screws, bolts, nuts, etc. connectors.

In some embodiments, an inclination direction D1 of the connection piece 12 defines an acute angle $\alpha 1$ with the axial direction 42.

In some embodiments, the connection piece 12 is connected with a wing 3 of the aircraft 1.

Figure 3:
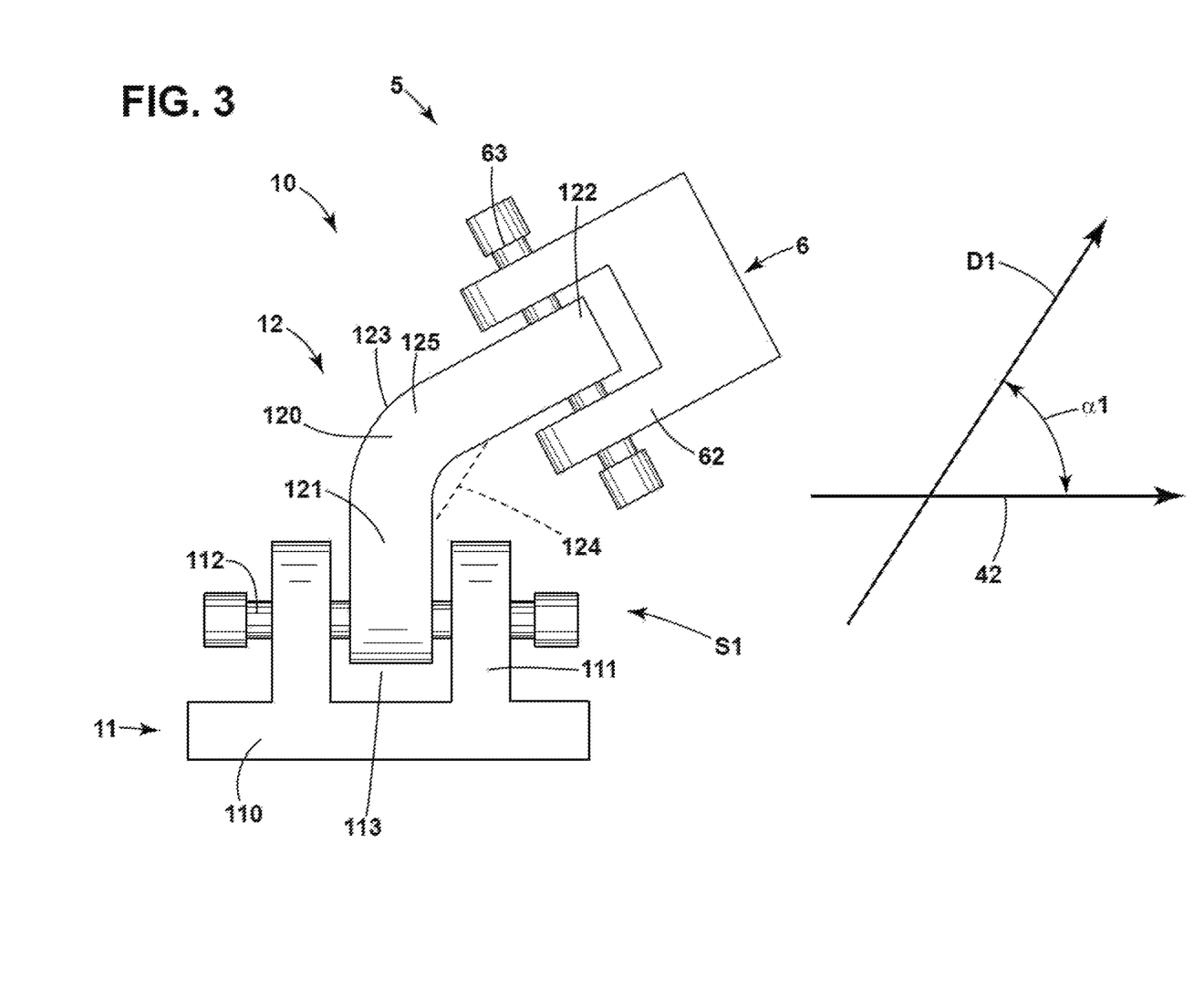
FIG. 3 illustrates a schematic side elevation view of a connection assembly connected with a mounting structure of FIG. 2.

Referring also to FIG. 3, in some embodiments, the connection piece 12 comprises a link 120 having a first end 121 connected with the engine coupling piece 11, a second end 122 opposite to the first end 121 and connected with the mounting structure 6, and a beam 123 between the first end 121 and the second end 122 and curved toward the axial direction 42. In some embodiments, the beam 123 has an additional bracing 124 about the curved section 125 thereof to enhance the mechanical strength thereof. In some embodiments, the inclination direction D1 is tangential to the curved section 125.

In some embodiments, the engine coupling piece 11 comprises a yoke 110 attached to the engine 4 by way of screws, bolts, nuts etc. connectors, a pair of lugs 111 extending upwardly from the yoke 110, and a pin 112 extending through the lugs 111 and coupled with the first end 121 of the connection piece 12. A cavity 113 between the lugs 111 opens radially and circumferentially and receives the first end 121.

In some embodiments, the mounting structure 6 comprises a pair of lugs 62 and a pin 63 extending through the lugs 62 and coupled with the second end 122 of the connection piece 12.

As is shown in FIGS. 2 and 3, because of the curved section 125, the connection piece 12 is inclined toward the axial direction 42 and the engine 4 is mounted to the mounting structure 6 in an inclined way. In addition, there is ample room for the connection piece 12 to curve toward the axial direction 42 and for the engine mounting system 5, hence the engine 4, to mount inclinedly with respect to the mounting structure 6, in turn the aircraft 1, and there is a big flexibility to determine the value of the angle $\alpha 1$ defined by the inclination direction D1 and the axial direction 42. A space S1 aft of the lugs 111 and the pin 112 is barely affected by the inclination of the connection piece 12 and is sufficient for accommodating a tool (not shown), such as a wrench, to operate therein.

Figure 4:
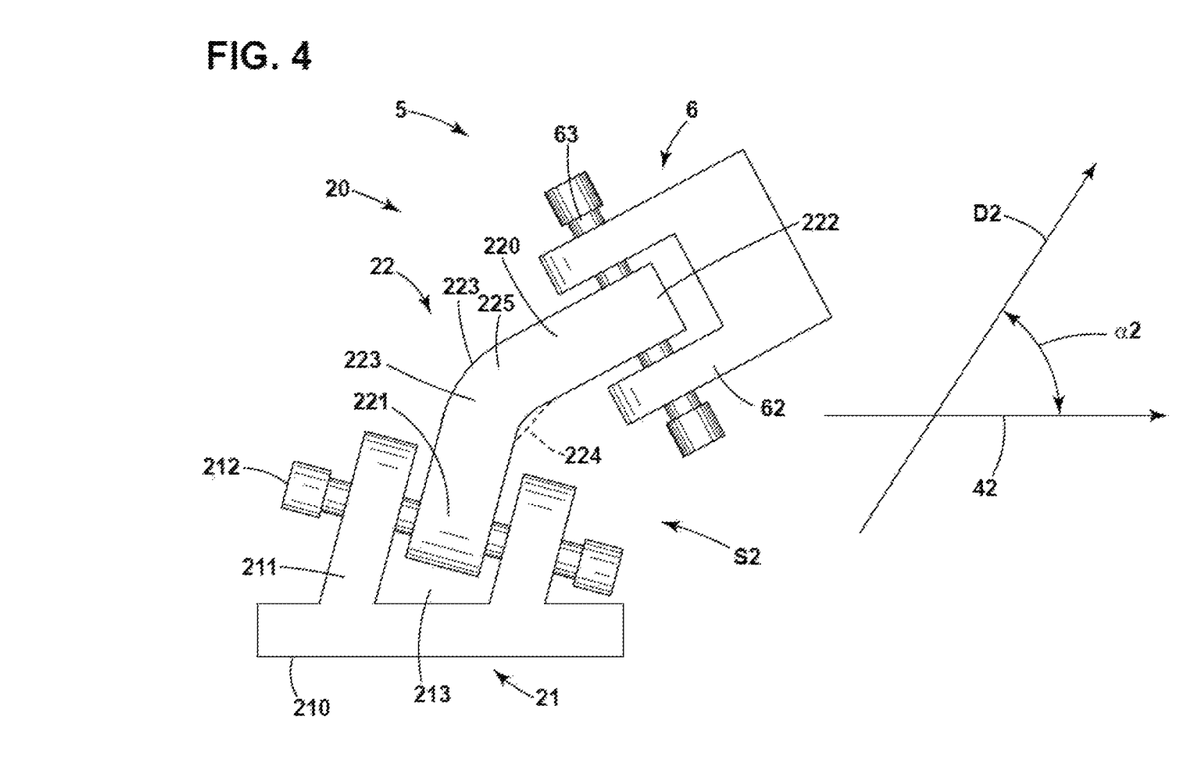
FIG. 4 is a schematic side elevation view of a connection assembly in accordance with a second embodiment of the present disclosure and connected with a mounting structure.

FIG. 4 is a schematic side elevation view of a connection assembly 20 in accordance with a second embodiment of the present disclosure and connected with a mounting structure 6.

The connection assembly 20 is similar to the connection assembly 10 except the pair of lugs 211 of the engine coupling piece 21 of the connection assembly 20 extend inclinedly toward the axial direction 42 while upwardly from the yoke 210. A cavity 213 between the lugs 211 opens radially and circumferentially and receives the second end 222 of the link 220 of the connection piece 22. In some embodiments, the beam 223 of the connection piece 22 has an additional bracing 224 about the curved section 225 thereof to enhance the mechanical strength thereof. In some embodiments, the inclination direction D2 is tangential to the curved section 225 between the first end 221 and the second end 222.

As is shown in FIG. 4, because of the curved section 225 and the inclined lugs 211, the connection piece 22 is inclined toward the axial direction 42 and the engine 4 is mounted to the mounting structure 6 in an inclined way through the coupling of the lugs 211, the pin 212, the first end 221, the second end 222, the lugs 62 and the pin 63 respectively as described in the above embodiment. There is ample room for the mounting system 5 to incline with respect to the mounting structure 6 and there is a big flexibility to determine the value of the angle $\alpha 2$ defined by the inclination direction D2 and the axial direction 42. A space S2 aft of the lugs 211 and the pin 212 is limitedly affected by the inclination of the connection piece 22 and the lugs 211 and is sufficient for accommodating a tool (not shown), such as a wrench, to operate therein.

Figure 5:
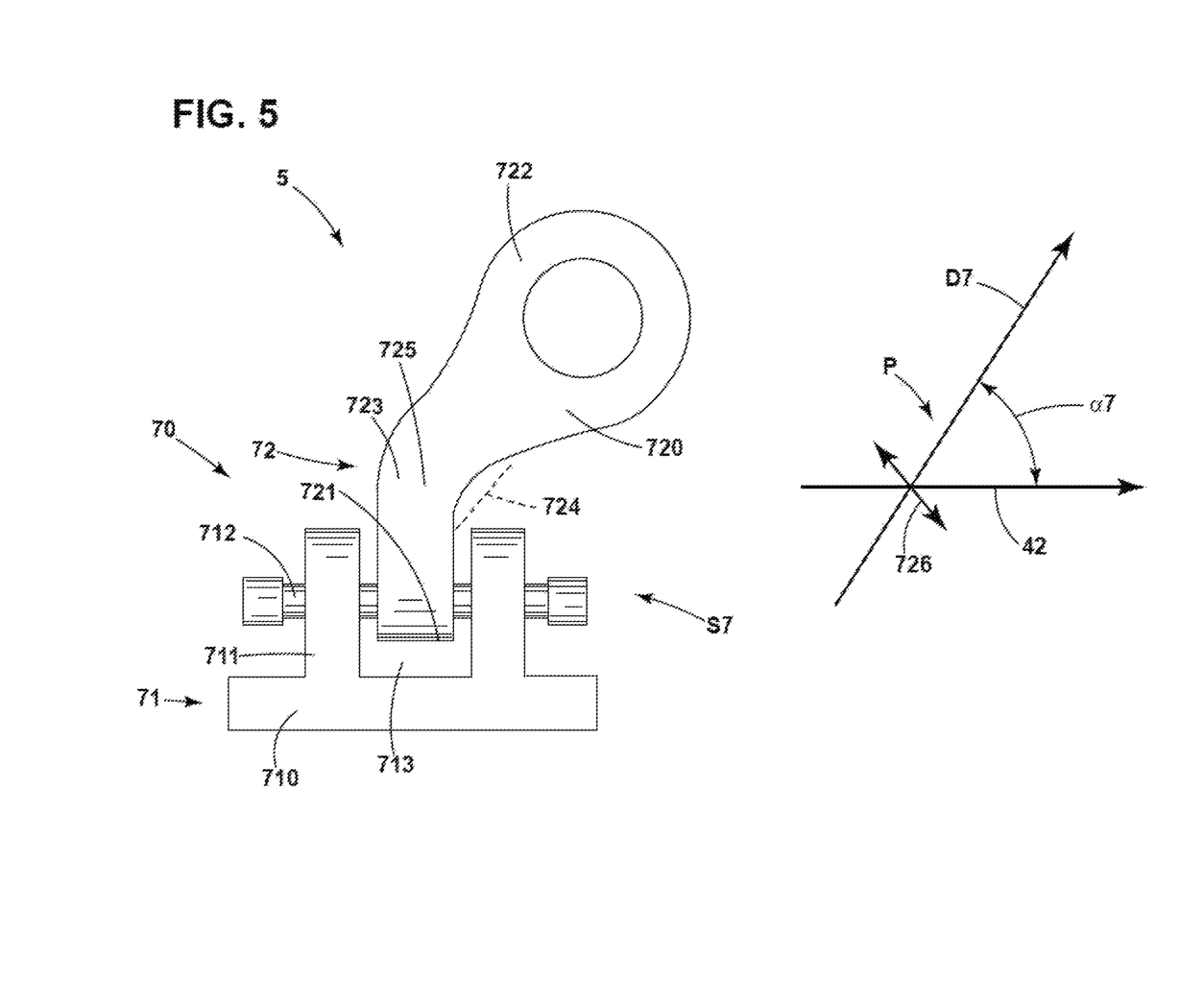
FIG. 5 shows a schematic side elevation view of a connection assembly in accordance with a third embodiment of the present disclosure.

FIG. 5 shows a schematic side elevation view of a connection assembly 70 in accordance with a third embodiment of the present disclosure.

The connection assembly 70 of the mounting system 5 is similar to the connection assembly 10 except that the second end 722 of the link 720 of the connection piece 72 is rotated and is perpendicular to a direction 726 extending out of a plane P defined by the axial direction 42 and an inclination direction D7 of the connection piece 72. In some embodiments, the beam 723 of the connection piece 72 has an additional bracing 724 about the curved section 725 thereof to enhance the mechanical strength thereof. In some embodiments, the inclination direction D7 is tangential to the curved section 725. A cavity 713 between the lugs 711 extending from the yoke 710 of the engine coupling piece 71 opens radially and circumferentially and receives the first end 721.

As is shown in FIG. 5, because of the curved section 725, the connection piece 72 is inclined toward the axial direction 42 and the engine 4 is mounted to the mounting structure 6 in an inclined way through the coupling of the lugs 711 extending from the yoke 710, the pin 712, the first end 721, the second end 722, and the lugs (not shown) and the pin (not shown) of the mounting structure (not shown). There is ample room for the connection piece 72 to curve toward the axial direction 42 and there is a big flexibility to determine the value of the angle $\alpha 7$ defined by the inclination direction D7 and the axial direction 42. A space S7 aft of the lugs 711 and the pin 712 is barely affected by the inclination of the connection piece 72 and is sufficient for accommodating a tool (not shown), such as a wrench, to operate therein. In addition, as the second end 722 of the connection piece 72 is rotated and is perpendicular to a direction 726 extending out of a plane P defined by the axial direction 42 and an inclination direction D7 of the connection piece 72, the space S7 is even bigger than only curving the connection piece 72.

Figure 6:
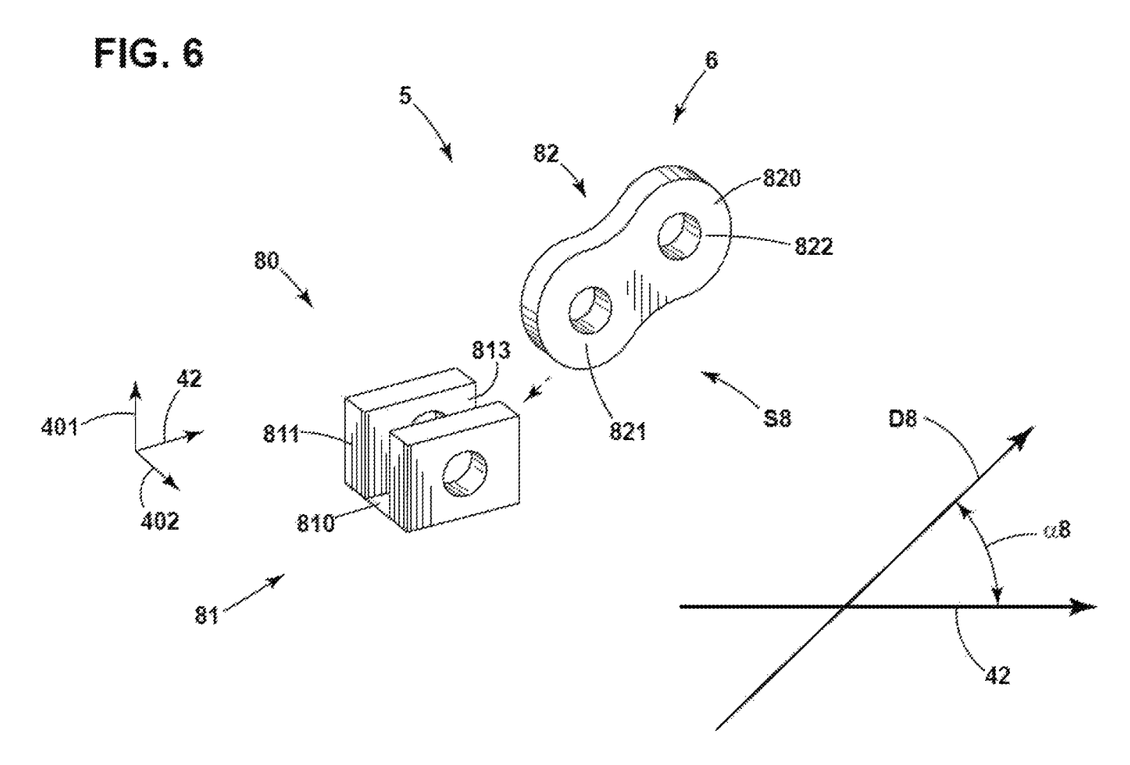
FIG. 6 illustrates a schematic exploded view of a connection assembly in accordance with a fourth embodiment of the present disclosure.

FIG. 6 illustrates a schematic exploded view of a connection assembly 80 in accordance with a fourth embodiment of the present disclosure.

The connection assembly 80 of the mounting system 5 is similar to the connection assembly 10 except that the lugs 811 of the engine coupling piece 81 are aligned toward the axial direction 42 and a cavity 813 between a pair of lugs 811 opens in the axial direction 42 and receives the first end 821 of the link 820 of the connection piece 82. The cavity 813 may open also in any of the radial direction 401 and the circumferential direction 402. In the exemplary embodiment, the inclination direction D8 is parallel to the direction from which the link 820 of the connection piece 82 extends from the first end 821 thereof to the second end 822 thereof.

As is shown in FIG. 6, because the cavity 813 opens in the axial direction 42, the connection piece 82 is inclined toward the axial direction 42 in any angle needed and the engine 4 is mounted to the mounting structure 6 in an inclined way through the coupling of the lugs 811 extending from the yoke 810, the pin (not shown) of the engine coupling piece 81, the first end 821, the second end 822, the lugs (not shown) and the pin (not shown) of the mounting structure 6 respectively as in embodiments described above. There is ample freedom for the connection piece 82 to incline toward the axial direction 42 and there is a big flexibility to determine the value of the angle $\alpha 8$ defined by the inclination direction D8 and the axial direction 42. A space S8 aft of the lugs 811 and the pin (not shown) is barely affected by the inclination of the connection piece 82 and is sufficient for accommodating a tool (not shown), such as a wrench, to operate therein.

Figure 7:
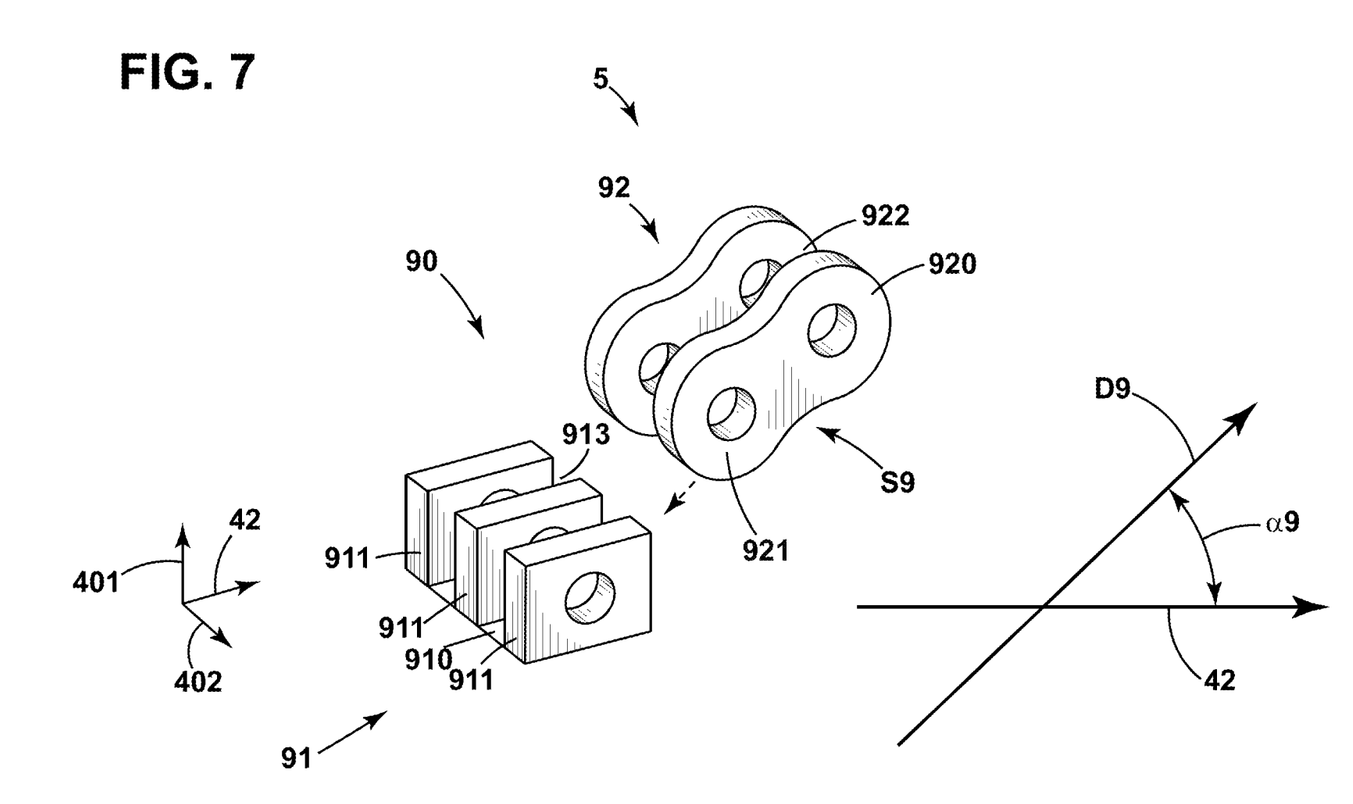
FIG. 7 is a schematic exploded view of a connection assembly in accordance with a fifth embodiment of the present disclosure.

FIG. 7 is a schematic exploded view of a connection assembly 90 in accordance with a fifth embodiment of the present disclosure.

The connection assembly 90 of the mounting system 5 is similar to the connection assembly 80 except that a lug 911 extending from a yoke 910 of the engine coupling piece 91 is coupled with a pair of links 920 of the connection piece 92. In this way, the manufacturing of the mounting system 5 and the connection assembly 90 is easier as the links are easier to manufacture than the lugs and less spherical bearings are needed.

In the exemplary embodiment, the lugs 911 are aligned toward the axial direction 42 and a cavity 913 between a pair of lugs 911 of the engine coupling piece 91 opens in the axial direction 42 and receives the first end 921 of the link 920 of the connection piece 92. The cavity 913 may open also in any of the radial direction 401 and the circumferential direction 402. The inclination direction D9 is parallel to the direction from which the link 920 of the connection piece 92 extends from the first end 921 thereof to the second end 922 thereof.

There is ample freedom for the connection piece 92 to incline toward the axial direction 42 and there is plenty of flexibility to determine the value of the angle α9 defined by the inclination direction D9 and the axial direction 42. A space S9 aft of the lugs 911 and the pin (not shown) is barely affected by the inclination of the connection piece 92 and is sufficient for accommodating a tool (not shown), such as a wrench, to operate therein.

As is described above, the connection piece 12, 22, 72, 82, 92 may be inclined toward the axial direction 42 by any of curving the link 120, 220, 720, inclining the lugs 211, rotating the second end 722, aligning the lugs 811, 911 toward the axial direction 42. The connection piece 12, 22, 72, 82, 92 may be inclined toward the axial direction 42 in other ways to allow ample room to operate after inclinedly mounting the engine system 5 to the mounting structure. In some embodiments, the inclination direction D1, D2, D7, D8, D9 is parallel to a line extending through the first end 121, 221, 721, 821, 921 and the second end 122, 222, 722, 822, 922.

The actuate angles α1, α2, α7, α8, and α9 defined by the inclination direction D1, D2, D7, D8, D9 and the axial direction 42 may be same as or different from each other in values. The angle α1, α2, α7, α8, and α9 may vary in values in a relatively big range to accommodate different application needs. In some embodiments, the angle α1, α2, α7, α8, α9 is less than about 75 degrees. In some embodiments, the angle α1, α2, α7, α8, α9 is in a range of from about 55 degrees to about 65 degrees.

The yokes 110, 210, 710, 810, 910 and corresponding lugs 111, 211, 711, 811, 911 may be formed integrally or separately. The number of lugs 111, 211, 711, 811, 911 and corresponding links 120, 220, 720, 820, 920 may vary depending on the configuration of the mounting system 5 and the mounting structure 6.

The connection piece 12, 22, 72, 82, 92 is described above to connect with the engine coupling piece 11, 21, 72, 81, 91 and the mounting structure 6 respectively by the lugs 111, 211, 711, 811, 911, 62 and pins 112, 212, 712. However, the connection piece 12, 22, 72, 82, 92 can connect with the engine coupling piece 11, 21, 72, 81, 91 and the mounting structure 6 respectively by other configuration, for example, screws, bolts and nuts etc. connectors, as long as at least part of the connection piece 12, 22, 72, 82, 92 extends neither parallel to nor perpendicular with the axial direction 42 and there is ample room to operate after inclinedly mounting the engine system 5 to the mounting structure 6.

The above-described embodiments of a connection assembly and a mounting system provides a cost-effective and reliable means for coupling an engine to an aircraft wing with a bigger inclining freedom to reduce backbone bending and clearance distortion in the core of the engine.

Exemplary embodiments of connection assemblies and mounting systems are described above in detail. The connection assemblies and the mounting systems are not limited to the specific embodiments described herein, but rather, components of assemblies and/or systems may be utilized independently and separately from other components described herein. For example, the assemblies and systems may also be used in combination with other engines and aircrafts, and are not limited to practice with only the engines and aircrafts as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A connection assembly mounting an engine to a mounting structure, the engine defining a centerline that defines an axial direction extending from a forward end to an aft end, the engine comprising a center of gravity, the connection assembly comprising:
    an engine coupling piece coupled to an aft portion of a fan case of the engine, wherein the engine coupling piece comprises a pair of lugs defining a cavity therebetween opening in the axial direction; and
    a connection piece including a link connecting the engine coupling piece and the mounting structure wherein the mounting structure is a pylon positioned aft of the engine coupling piece, the connection piece inclined toward the axial direction, wherein the link has a first end connected with the engine coupling piece, a second end opposite to the first end and connected with the mounting structure, and a beam between the first end and the second end and curved toward the axial direction, and the engine coupling piece configured such that force transferred from the aft portion of the fan case to the mounting structure is to be transmitted from the aft portion of the fan case to the connecting piece to the engine coupling piece and to the mounting structure.

2. The connection assembly of claim 1, being forward of the center of gravity of the engine.

3. The connection assembly of claim 1, wherein an inclination direction of the connection piece defines an acute angle with the axial direction.

4. The connection assembly of claim 1, wherein the engine coupling piece is coupled to the fan case of the engine.

5. The connection assembly of claim 1, wherein the connection piece is connected with an aircraft.

6. An engine mounting system, comprising:
- a mounting structure and the mounting structure is a pylon;
- an engine defining a centerline that defines an axial direction extending from a forward end to an aft end, the engine having a center of gravity and mountable to the mounting structure;
- a connection assembly, comprising:
  - an engine coupling piece coupled to an aft portion of a fan case of the engine, wherein the engine coupling piece comprises a pair of lugs defining a cavity therebetween opening in the axial direction; and
  - a connection piece including a link connecting the engine coupling piece and the pylon, the connection piece inclined toward the axial direction, wherein the link has a first end connected with the engine coupling piece, a second end opposite to the first end and connected with the mounting structure, and a beam between the first end and the second end and curved toward the axial direction, and the engine coupling piece configured such that force transferred from the aft portion of the fan case to the mounting structure is to be transmitted from the aft portion of the fan case to the connecting piece to the engine coupling piece and to the mounting structure;
- an engine aft mount located aftward of the connection assembly and coupling the engine and the mounting structure; and
- a thrust link located between the connection assembly and the engine aft mount and coupling the engine and the mounting structure.

7. The engine mounting system of claim 6, wherein the connection assembly is forward of the center of gravity of the engine.

8. The engine mounting system of claim 6, wherein an inclination direction of the connection piece defines an acute angle with the axial direction.

9. The engine mounting system of claim 6, the engine coupling piece is coupled to the fan case of the engine.

10. The engine mounting system of claim 6, wherein the connection piece is connected with an aircraft.

* * * * *